(12) United States Patent
Kawakami

(10) Patent No.: US 10,245,897 B2
(45) Date of Patent: Apr. 2, 2019

(54) PNEUMATIC TIRE

(71) Applicant: BRIDGESTONE CORPORATION, Chuo-ku, Tokyo (JP)

(72) Inventor: Yuki Kawakami, Pomezia (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 608 days.

(21) Appl. No.: 14/351,065

(22) PCT Filed: Oct. 12, 2012

(86) PCT No.: PCT/JP2012/077020
§ 371 (c)(1),
(2) Date: Apr. 10, 2014

(87) PCT Pub. No.: WO2013/054950
PCT Pub. Date: Apr. 18, 2013

(65) Prior Publication Data
US 2014/0290817 A1    Oct. 2, 2014

(30) Foreign Application Priority Data

Oct. 13, 2011 (JP) ................. 2011-226226

(51) Int. Cl.
*B60C 11/03* (2006.01)
*B60C 11/00* (2006.01)
*B60C 11/13* (2006.01)

(52) U.S. Cl.
CPC ....... *B60C 11/1307* (2013.01); *B60C 11/0306* (2013.01); *B60C 2011/0358* (2013.01); *B60C 2011/0365* (2013.01); *B60C 2011/133* (2013.01)

(58) Field of Classification Search
CPC .......... B60C 11/1307; B60C 2011/133; B60C 2011/0381; B60C 2011/0348; B60C 2011/0386; B60C 2200/065
See application file for complete search history.

(56) References Cited

U.S. PATENT DOCUMENTS 4,461,334 A * 7/1984 Tansei ..................... B60C 11/11
152/209.26
6,220,321 B1 * 4/2001 Yoshioka ............ B60C 11/0306
152/209.18
(Continued)

FOREIGN PATENT DOCUMENTS

CN     1672965 A    9/2005
CN     1765642 A    5/2006
(Continued)

OTHER PUBLICATIONS

Machine Translation: JP 2010023610 A; Yoda, Hidetoshi; No date.*
(Continued)

*Primary Examiner* — Kendra Ly
(74) *Attorney, Agent, or Firm* — Sughrue Mion, PLLC

(57) ABSTRACT

A pneumatic tire according to the present invention including a tread surface having at least one circumferential groove extending along a tire circumferential direction and a plurality of widthwise grooves opening to the circumferential groove, the widthwise grooves having a groove width wider than a groove width of the circumferential groove at least in a portion opening to the circumferential groove and, the widthwise grooves extending in a direction inclined with respect to the tire circumferential direction, wherein a recess is formed on a groove wall surface of the circumferential groove opposite to the widthwise groove.

5 Claims, 7 Drawing Sheets
(3 of 7 Drawing Sheet(s) Filed in Color)

(56) References Cited

U.S. PATENT DOCUMENTS

| | | | |
|---|---|---|---|
| 6,415,835 B1 * | 7/2002 | Heinen | B60C 11/0309 152/209.21 |
| 2006/0269636 A1 * | 11/2006 | Miyamae | B29D 30/0606 425/35 |
| 2008/0047644 A1 | 2/2008 | Yoshikawa et al. | |
| 2011/0005649 A1 * | 1/2011 | Aoki | B60C 11/0306 152/209.1 |
| 2014/0290817 A1 | 10/2014 | Kawakami | |

FOREIGN PATENT DOCUMENTS

| | | | | |
|---|---|---|---|---|
| CN | 101130332 A | | 2/2008 | |
| EP | 0454657 A2 | | 10/1991 | |
| EP | 2163405 A1 | | 3/2010 | |
| EP | 2 772 369 A1 | | 9/2014 | |
| GB | 460338 A | * | 1/1937 | ............. B60C 11/00 |
| JP | 07096716 A | * | 4/1995 | |
| JP | 1134615 A | | 2/1999 | |
| JP | 2003-205706 A | | 7/2003 | |
| JP | 2008500923 A | | 1/2008 | |
| JP | 2008-221964 A | | 9/2008 | |
| JP | 2009-137519 A | | 6/2009 | |
| JP | 2010023610 A | * | 2/2010 | .......... B60C 11/0311 |
| WO | 2013/054950 A1 | | 4/2013 | |

OTHER PUBLICATIONS

Machine Translation: JP-07096716-A; Yamashita, Nobuhiro (Year: 2018).*
Communication dated Sep. 6, 2015 from the State Intellectual Property Office of the People's Republic of China in counterpart Application No. 201280046706.0.
Communication dated Dec. 24, 2013 from the Japanese Patent Office issued in corresponding Japanese application No. 2011226226.
Communication dated Apr. 10, 2015 from the Australian Intellectual Property Office in counterpart application No. 2012321677.
Communication dated Mar. 11, 2015, issued by the Canadian Intellectual Property Office in counterpart Application No. 2850924.
International Search Report, PCT/JP2012/077020, dated Dec. 18, 2012.
Communication dated Jul. 8, 2015 from the European Patent Office in counterpart application No. 12840590.9.
Communication dated Nov. 6, 2017, from Canadian Intellectual Property Office in counterpart application No. 2850924.

* cited by examiner

FIG. 2
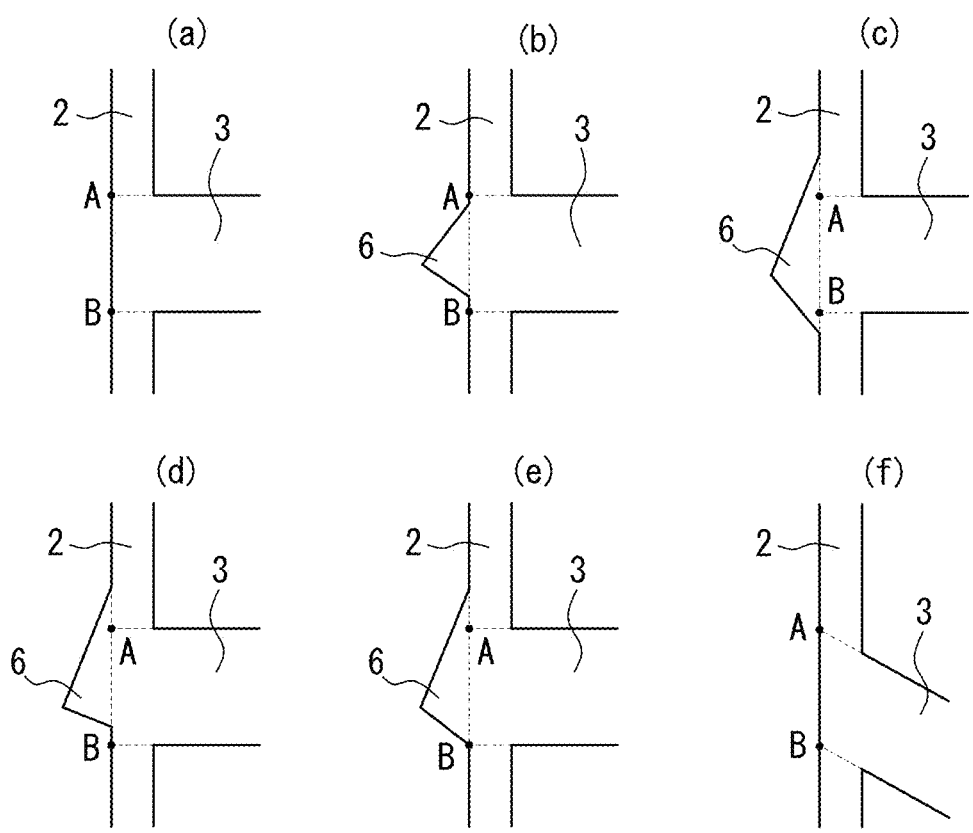
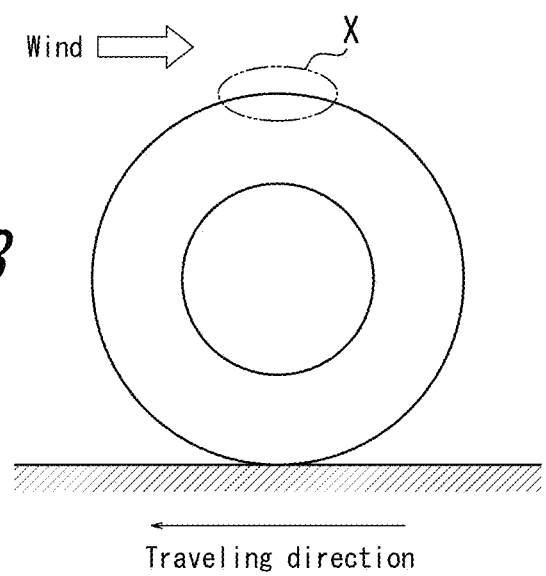
FIG. 3

(a)

(b)

(c)

(a)

(b)

(c)

Velocity of airflow [km/h]

(a)

(b)

PNEUMATIC TIRE

CROSS REFERENCE TO RELATED APPLICATIONS

This application is a National Stage of International Application No. PCT/JP2012/077020 filed Oct. 12, 2012, claiming priority based on Japanese Patent Application No. 2011-226226 filed Oct. 11, 2011, the contents of all of which are incorporated herein by reference in their entirety.

TECHNICAL FIELD

The present invention relates to a pneumatic tire that lowers the temperature of a tread portion by promoting heat dissipation thereof, and more specifically, to a pneumatic tire suitably used for a heavy duty vehicle such as a construction vehicle and the like.

BACKGROUND ART

When the tread portion generates heat during rotation of the tire with a load applied thereon, the temperature of the tread portion rises, causing various failures such as heat separation of the tread portion and the like. Therefore, in order to lower the temperature of the tread portion, it is necessary to reduce the heat generation or to promote heat dissipation.

Conventionally, in order to lower the temperature of the tread portion, there has been employed a method of forming grooves in the tread portion by removing tread rubber that serves as a heat source and, simultaneously, increasing a surface area of the tread portion such that the heat dissipation is enhanced (For example, Patent Document 1).

RELATED ART DOCUMENT

Patent Document

Patent Document 1: Japanese Patent Application Laid-Open Publication No. 2003-205706

SUMMARY OF INVENTION

Technical Problem

However, the method described above needs to increase the number of grooves in order to improve an effect to lower the temperature. Such an increase in the number of grooves, however, leads to a reduction in rigidity of a land portion, causing deterioration of antiwear performance and steering stability.

As such, an object of the present invention is to provide a pneumatic tire having a minimized increase in a groove area, thereby promoting the heat dissipation of the tread portion and lowering the temperature thereof.

Solution to Problem

A summary of the present invention is as follows:
(1) A pneumatic tire having, in a tread surface, at least one circumferential groove extending along a tire circumferential direction and a plurality of widthwise grooves opening to the circumferential groove, the widthwise grooves having a groove width wider than a groove width of the circumferential groove at least in a portion opening to the circumferential groove, and the widthwise grooves extending in a direction inclined with respect to the tire circumferential direction, wherein
a recess is formed on a groove wall surface of the circumferential groove opposite to the widthwise groove.
(2) The pneumatic tire according to (1) set forth above, wherein a length of the recess in a tire width direction varies along the tire circumferential direction.
(3) The pneumatic tire according to (1) or (2) set forth above, wherein the length of the recess in the tire circumferential direction decreases from a side of the recess opening to the circumferential groove toward a bottom of the recess.
(4) The pneumatic tire according to any one of (1) to (3) set forth above, wherein the recess has an asymmetric planar shape when viewed from the tread surface.
(5) The pneumatic tire according to any one of (1) to (4) set forth above, wherein the widthwise groove is inclined with respect to the tire width direction.

Effect of the Invention

According to the present invention, since an increase in a groove area is minimized, a pneumatic tire that, without incurring a reduction in rigidity of a land portion, promotes heat dissipation of a tread portion and lowers the temperature thereof may be provided.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 2(a) to (f) are diagrams illustrating positions of a recess;

FIG. 3 is a diagram illustrating a function of the present invention;

DESCRIPTION OF EMBODIMENT

The following is a detailed description of a pneumatic tire according to the present invention with reference to the accompanying drawings.

Figure 1:
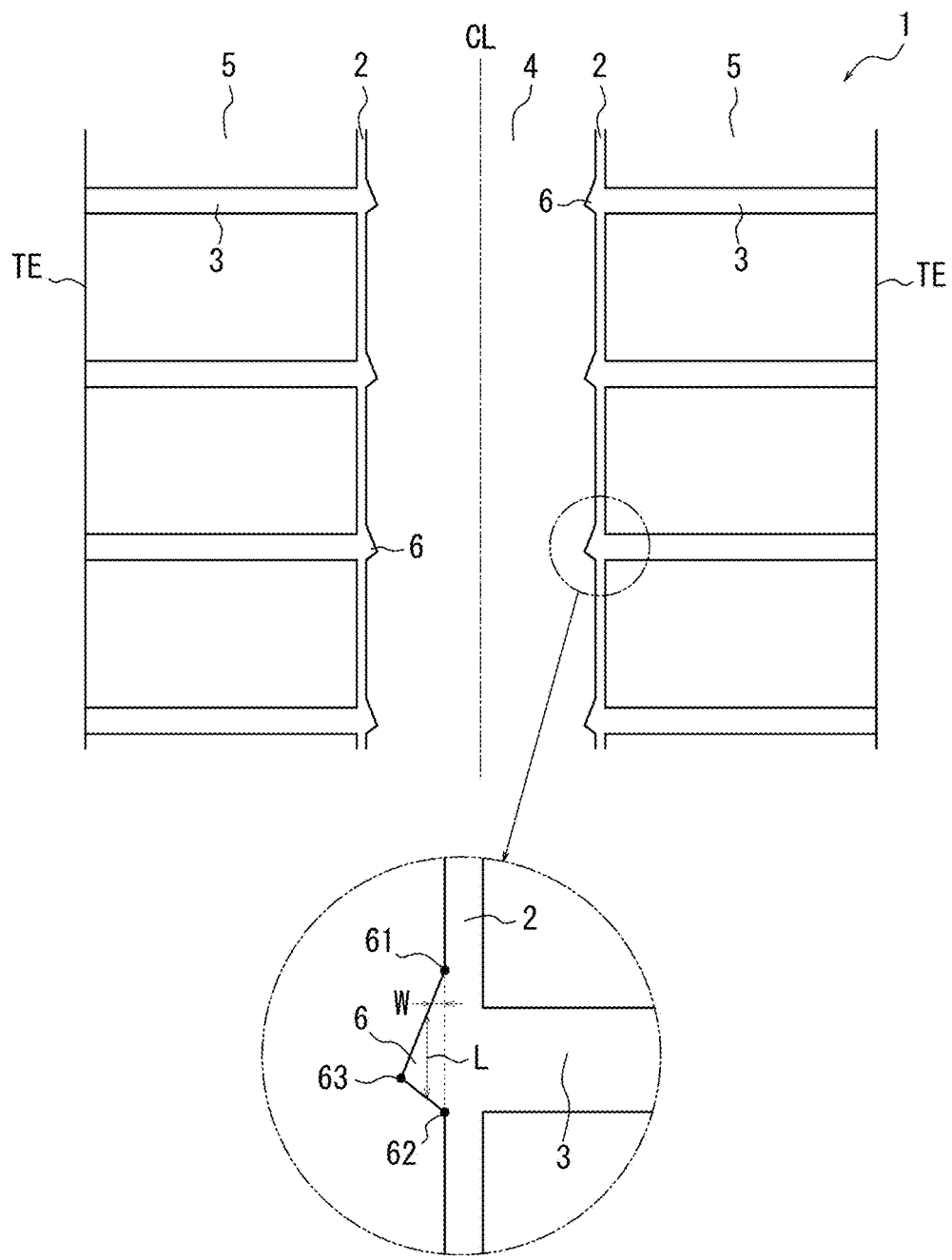
FIG. 1 is a developed view of a tread pattern of a pneumatic tire according to the present invention.

FIG. 1 is a developed view of a tread pattern of the pneumatic tire according to the present invention suitably used for a heavy duty vehicle. A tread surface 1 includes: a pair of circumferential grooves 2 extending along a tire circumferential direction across a tire equatorial plane CL; and a plurality of widthwise grooves 3 opening to the circumferential groove 2, the widthwise grooves having a groove width wider than a groove width of the circumferential groove 2 at least in a portion opening to the circumferential groove 2. The widthwise groove 3 is communicating with a tread end TE.

A rib-shaped central land portion 4 including the tire equatorial plane CL is formed by the pair of central circumferential grooves 2. Also, a block-shaped land portion 5 is formed by the circumferential groove 2 and the widthwise grooves 3.

Note that the tread pattern is illustrated in the figure by way of example, and the present invention is applicable to both rib trend patterns and block trend patterns. Also, the widthwise groove 3 may be inclined with respect to a tire width direction, and may have a non-constant width. Further, the widthwise groove 3 does not need to be communicating with the tread end TE.

In the rib-shaped central land portion 4, a recess 6 is formed on a groove wall surface of the circumferential groove 2 opposite to the widthwise groove 3.

As illustrated in an enlarged view, a length W of the recess 6 in the tire width direction varies along the tire circumferential direction. That is, the length W gradually increases from a connection point 61 between the recess 6 and the circumferential groove 2 to an apex 63 of the recess 6 and then gradually decreases from the apex 63 to a connection point 62 between the recess 6 and the circumferential groove 2.

Also, a length L of the recess 6 in the tire circumferential direction decreases from a side opening to the circumferential groove 2 toward a bottom of the recess. That is, the length L is the longest between the connection point 61 and the connection point 62 and decreases as it becomes closer to the apex 63.

Referring now to FIG. 2, the groove wall surface of the circumferential groove 2 opposite to the widthwise groove 3 will be described.

As illustrated in FIG. 2 (*a*), when the recess 6 is not formed, the groove wall surface of the circumferential groove 2 opposite to the widthwise groove 3 represents a groove wall surface between points A, B, which are intersections of extended groove wall surfaces of the widthwise groove 3 and the groove wall of the circumferential groove 2.

The recess 6 may be formed between the point A and the point B as illustrated in FIG. 2(*b*), or protrude outside the points A, B as illustrated in FIG. 2(*c*). Or, as illustrated in FIG. 2(*d*), one of the intersections of the circumferential groove 2 and the recess 6 may be formed between the point A and the point B while the other is formed outside the points A, B. That is, the recess 6 is formed at least partially between the points A, B.

The recess 6, as illustrated in FIG. 2(*e*), is preferably formed having one of the intersections thereof with the circumferential groove 2 formed outside the points A, B and the other meeting the point B.

As illustrated in FIG. 2(*f*), further, when the widthwise groove 3 is inclined with respect to the tire width direction, the groove wall surface of the circumferential groove 2 opposite to the widthwise groove 3 represents a groove wall surface between the points A, B, which are intersections of extended groove wall surfaces of the widthwise groove 3 and the groove wall of the circumferential groove 2.

The following is a description of a function of the present invention.

As illustrated in FIG. 3, when the tire rotates, the wind around the tire flows in a direction opposite to a traveling direction. By taking this wind into the groove formed on the tread surface 1 and discharging the wind therefrom, heat dissipation of the tread portion occurs and the temperature of the tread portion lowers. In a pneumatic tire for a construction vehicle, in particular, since a portion denoted by X on a vehicle side (on a side opposite to the tread surface) in the figure is not covered by the vehicle but exposed, taking the wind into the groove exhibits a markable heat dissipation effect.

When a wide groove is formed on the tread surface 1, although more wind may be taken into the groove, rigidity of the land portion is reduced and antiwear performance and steering stability are deteriorated. Therefore, it is necessary to lower the temperature of the tread portion without dramatically changing a groove width of an existing groove.

Figure 4:
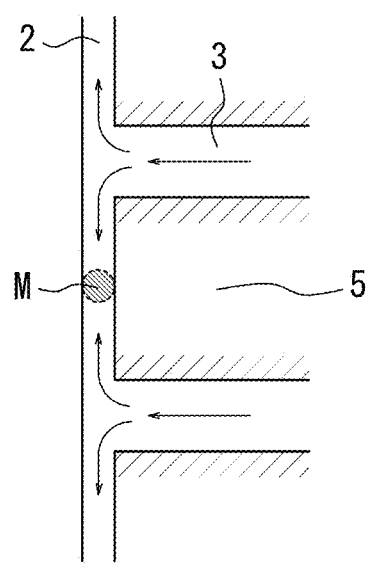
FIGS. 4(a) to (c) are diagrams illustrating a function of the present invention.
Figure 4:
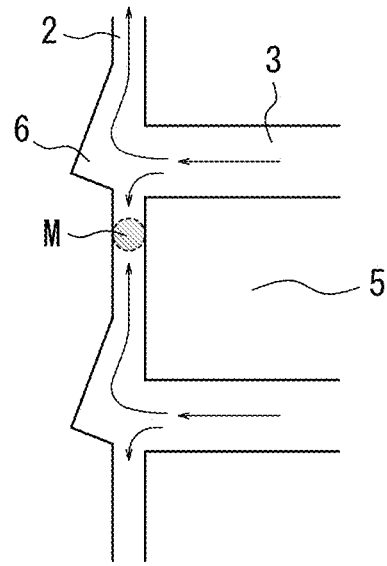
Figure 4:
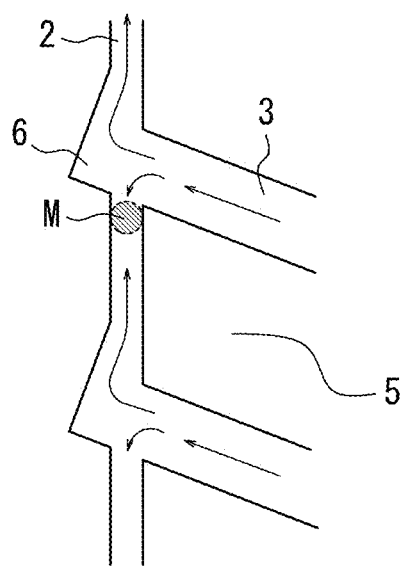

The inventor studied airflow inside the groove and found that, in a tread pattern having the circumferential grooves 2 with a narrow groove width and the widthwise grooves 3 with a wide groove width as illustrated in FIG. 4(*a*), the temperature is high at a point M which is an intermediate point of the circumferential groove 2 between two widthwise grooves 3 next to each other in the tire circumferential direction.

Although the temperature of the block-shaped land portion 5 is raised by the rotation of the tire with a load applied thereon, the temperature of a portion (shaded area) of the block-shaped land portion 5 in the proximity of the widthwise groove 3 lowers due to the heat dissipation by the wind flowing inside the widthwise groove 3. On the other hand, the heat dissipation does not occur in a portion of the block-shaped land portion 5 where it is remote from the widthwise groove 3. To specifically explain with reference to FIG. 4(*a*), inside the widthwise groove 3, the wind flows from the tread end TE to the circumferential groove 2 as indicated by an arrow. This wind hits the groove wall surface of the circumferential groove 2 opposite to the widthwise groove 3 and is separated into wind flowing forward and wind flowing backward with respect to a tire rotational direction. As illustrated in the figure, when the widthwise groove 3 is formed perpendicular to the circumferential groove 2, the wind having hit the groove wall surface is separated into the wind flowing forward and the wind flowing backward in the same amounts. The wind flowing forward enters the circumferential groove 2 from the widthwise groove 3 and then, at the intermediate point M, collides with the wind flowing backward that have entered the circumferential groove 2 from the widthwise groove 3. Accordingly, since those winds stagnate at the intermediate point M, the heat dissipation of the block-shaped land portion 5 may not occur.

Note that the groove width of the circumferential groove 2 is narrower than the groove width of the widthwise groove 3 in a portion opening to the circumferential groove 2. In the embodiment illustrated in the figures, in particular, since the groove width of the circumferential groove 2 is narrower than any portion of the groove width of the widthwise groove 3, a portion of the block-shaped land portion 5 adjacent to the circumferential groove 2 does not cause as much heat dissipation as a portion of the block-shaped land portion 5 adjacent to the widthwise groove 3.

As such, as illustrated in FIG. 4(*b*), the recess 6 is formed on the groove wall surface of the circumferential groove 2 opposite to the widthwise groove 3 such that the wind having entered the circumferential groove 2 from the widthwise groove 3 is unevenly separated inside the circumferential groove 2. Thereby, the intermediate point M where the winds collide with each other inside the circumferential groove 2 shifts to a position closer to the widthwise groove 3 and the wind enters the circumferential groove 2 adjacent to a portion of the block-shaped land portion 5 with the highest temperature (an intermediate portion of the block-shaped land portion 5 with respect to the tire circumferential direction), lowering the temperature of the tread portion.

As illustrated in FIG. 4(*c*), also, it is preferable that the widthwise groove 3 is inclined with respect to the tire width direction and, simultaneously, the recess 6 is formed. Thereby, the wind having entered the circumferential groove 2 from the widthwise groove 3 may be unevenly separated inside the circumferential groove 2, and the intermediate point M where the winds collide with each other inside the circumferential groove 2 may shift to a position further closer to the widthwise groove 3.

Figure 5:
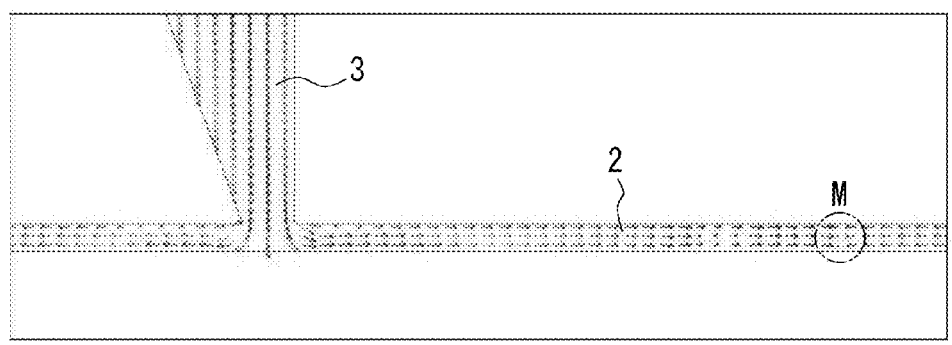
FIGS. 5(a) to (c) are diagrams illustrating wind velocity vectors on bottoms of a circumferential groove and a widthwise groove.
Figure 5:
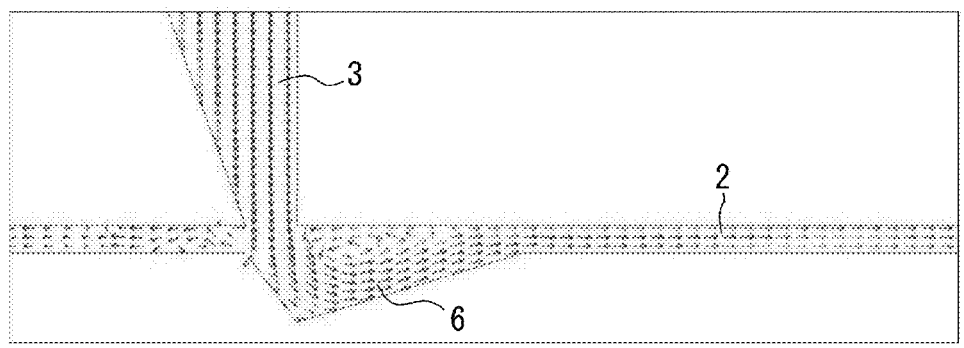
Figure 5:
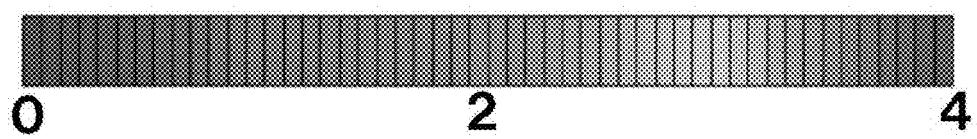

Referring now to FIG. 5, a numerical analysis of a wind velocity vector on the bottoms of the circumferential groove 2 and the widthwise groove 3 will be described.

FIG. 5(*a*) illustrates the groove wall surface of the circumferential groove 2 opposite to the widthwise groove 3 having no recess 6 formed thereon, and FIG. 5(*b*) illustrates the groove wall surface of the circumferential groove 2 opposite to the widthwise groove 3 having the recess 6 formed thereon. FIG. 5(*c*) illustrates a wind flow rate.

As illustrated in FIG. 5(*a*), when the recess 6 is not formed, the flow rate becomes low and the winds collide with each other at the intermediate point M.

As illustrated in FIG. 5(*b*), on the other hand, when the recess 6 is formed, the flow rate inside the circumferential groove 2 is increased and the point where the winds collide with each other is shifted.

Figure 6:
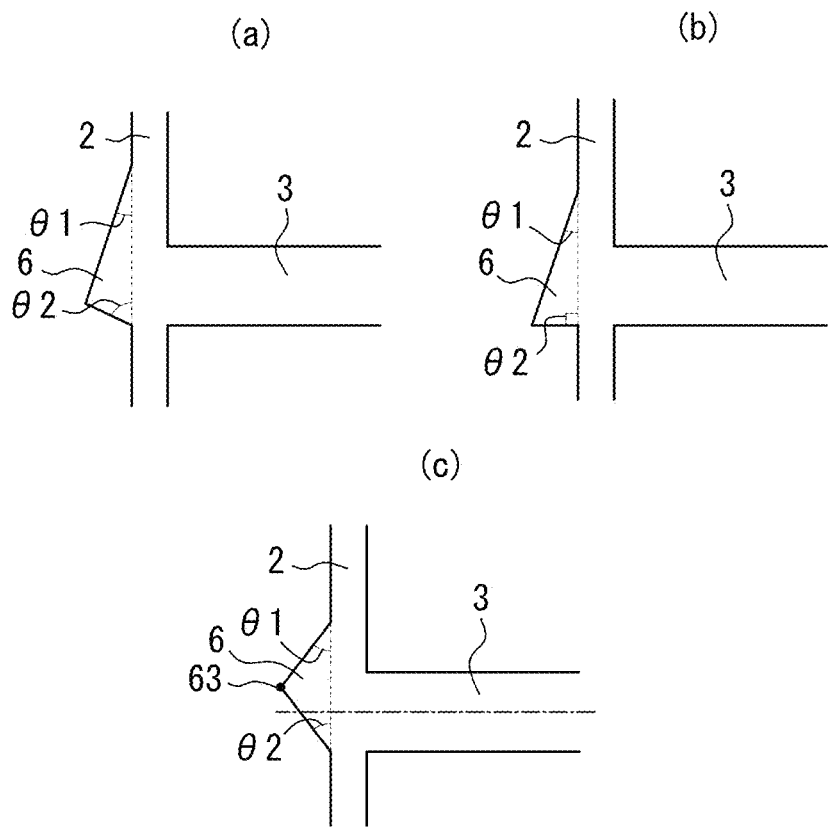
FIGS. 6(a) to (c) are diagrams illustrating various modifications of the recess.
Figure 7:
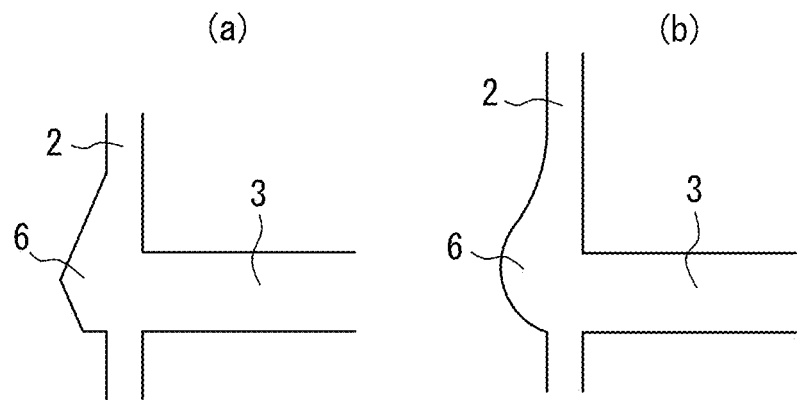
FIGS. 7(a), (b) are diagrams illustrating various modifications of the recess.

The following is a description of various modifications of the recess 6 with reference to FIG. 6 and FIG. 7.

As illustrated in FIG. 6(*a*), the recess 6 preferably has an asymmetric triangle shape with internal angles θ1 and θ2 between the recess 6 and the circumferential groove 2 that satisfy θ1<θ2.

As illustrated in FIG. 6(*b*), θ2 may be 90 degrees.

As illustrated in FIG. 6(*c*), the recess 6 may have an isosceles triangle shape with internal angles θ1, θ2 equal to each other. In this case, the recess 6 is preferably formed at a position displaced from the widthwise groove 3. That is, the recess 6 is preferably formed such that the apex 63 is displaced from a center line of the widthwise groove 3 (indicated by a dashed line in the figure).

The recess 6 may have, other than the triangular shape, a square shape as illustrated in FIG. 7(*a*) or a rounded shape as illustrated in FIG. 7(*b*).

In a plan view of the tread surface, the recess 6 has the length L in the tire circumferential direction no more than 150 mm and the length W in the tire width direction no more than 50 mm. When the recess 6 is too large, antiwear performance may possibly deteriorate. When the recess 6 is too small, on the other hand, a sufficient effect to change the distribution of the wind inside the circumferential groove 2 may not be obtained.

The recess 6 needs to be formed at least in a portion of the groove wall surface between the tread surface and the bottom of the groove, and is preferably formed on the bottom of the groove.

The temperature of the block-shaped land portion 5 is higher on a side close to a carcass and becomes lower as it is closer to the tread surface. Accordingly, the recess 6 is preferably formed on the bottom of the groove, thereby changing a direction of the wind inside the circumferential groove 2 adjacent to the portion with the higher temperature.

EXAMPLES

The following is a description of examples of the present invention.

Figure 8:
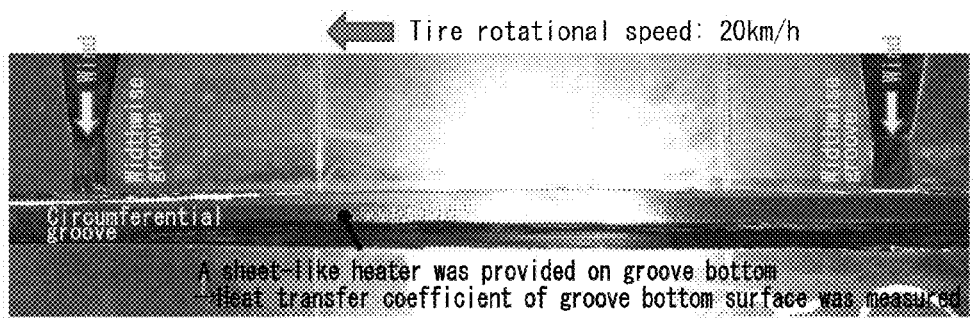
FIGS. 8(a), (b) are diagrams illustrating patterns of Example and Comparative Example.
Figure 8:
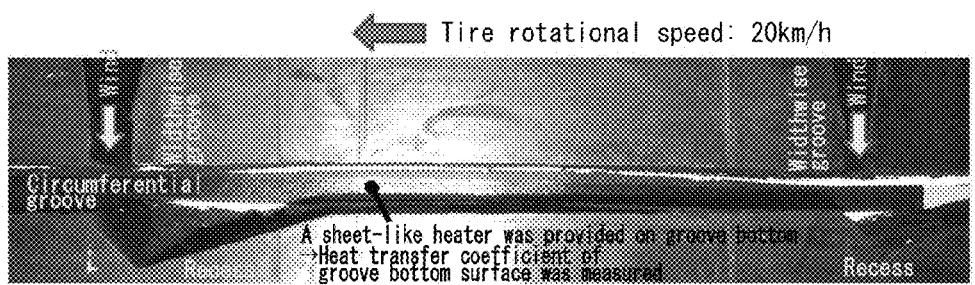

Ultra-large ORR (off-the-Road Radial) tires of 59/80R63 in size, which are suitably used for a heavy duty vehicle operated at a mine site and the like, having a pattern with the circumferential grooves and the widthwise grooves joined together were prepared. No recess was formed on the tire of Comparative Example (FIG. 8(*a*)), while a recess was formed at the intersection on the tire of Example (FIG. 8(*b*)). Then, a heat transfer coefficient distribution on the bottom of the circumferential groove of each of the tires was measured. The tires were rotated at a speed of 20 km/h.

Note that the tire of Example and the tire of Comparative Example are radial tires with a flat rate of no more than 80%, a rim diameter of no less than 57 inches, a load capacity of no less than 60 metric ton, and a load factor (k-factor) of no less than 1.7.

Figure 9:
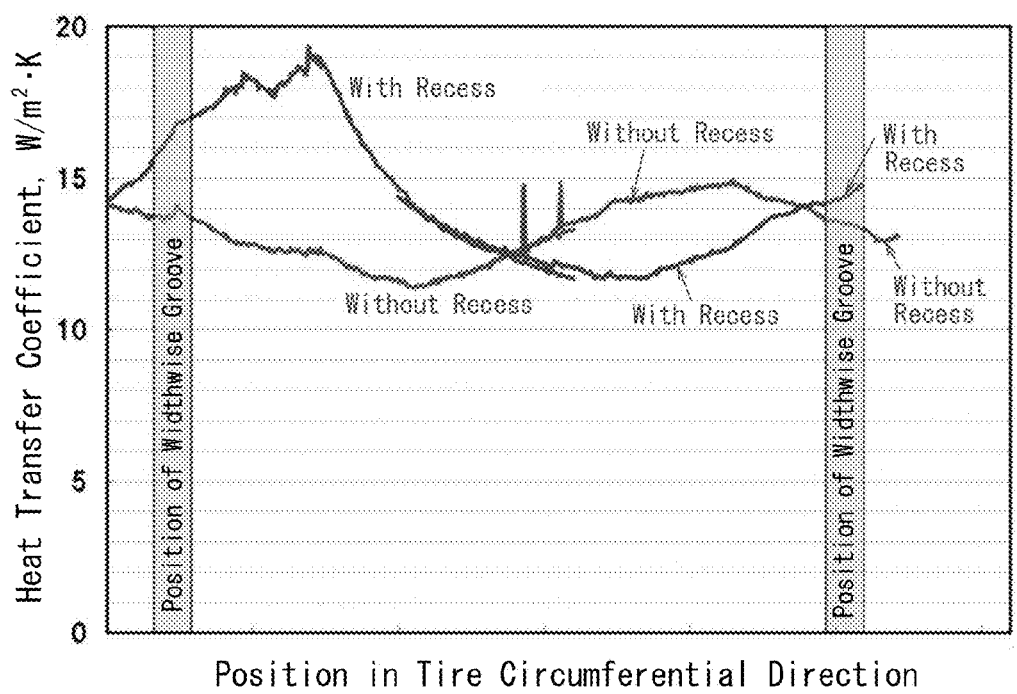
FIG. 9 is a graph illustrating heat transfer coefficients of Example and Comparative Example.

As illustrated in FIG. 9, the tire of Example having the recess exhibited a high heat transfer coefficient, on average, on the bottom of the circumferential groove.

REFERENCE SIGNS LIST

1 tread surface
2 circumferential groove
3 widthwise groove
4 rib-shaped central land portion
5 block-shaped land portion
6 recess

The invention claimed is:

1. A pneumatic tire having, in a tread surface, only a pair of circumferential grooves extending straight along a tire circumferential direction, the pair of circumferential grooves arranged on respective sides of a tire equatorial plane, the pair of circumferential grooves arranged inside a midpoint between the tire equatorial plane and a tread end in a tire width direction, and a plurality of widthwise grooves opening to each of the circumferential grooves, the widthwise grooves having a groove width wider than a groove width of each of the circumferential grooves at least in a portion opening to the circumferential groove, and the widthwise grooves extending in a direction inclined with respect to the tire circumferential direction, the widthwise grooves extending to a tread end, wherein
  a plurality of recesses are formed respectively in a groove wall surface of each of the circumferential grooves, each of the plurality of recesses is formed on the groove wall surface of the respective circumferential groove opposite to a respective one of the widthwise grooves, the groove wall surface of the respective circumferential groove between the plurality of recesses is straight,
  in a tread plan view, each of the plurality of recesses has an apex at an innermost portion in the tire width direction,
  each of the plurality of recesses connects with the respective circumferential groove at a first connecting point and a second connecting point, one of the first connecting point and the second connecting point arranged outside two intersections of extended groove wall surfaces of the widthwise groove and a groove wall of the respective circumferential groove, and the other of the first connecting point and the second connecting point meeting one of the two intersections,
  along the tire circumferential direction, a width of the plurality of recesses in the tire width direction gradually increases from the first connecting point to the apex and gradually decreases from the apex to the second connecting point, the apex of the plurality of recesses is spaced apart from a center line of the widthwise grooves, and a maximum width of the plurality of recesses in the tire width direction is equal to or less than 50 mm.

2. The pneumatic tire according to claim 1, wherein a length of each of the plurality of recesses in the tire circumferential direction decreases from a side of the respective recess opening to the circumferential groove toward a bottom of the respective recess.

3. The pneumatic tire according to claim 1, wherein each of the plurality of recesses has an asymmetric planar shape when viewed from the tread plan view.

4. The pneumatic tire according to claim 1, wherein the plurality of widthwise grooves are inclined with respect to the tire width direction.

5. The pneumatic tire according to claim 1, wherein a length of each of the plurality of recesses from the first connecting point to the second connecting point is no more than 150 mm.

* * * * *